US 6,534,944 B2

(12) United States Patent
Toyozawa et al.

(10) Patent No.: US 6,534,944 B2
(45) Date of Patent: Mar. 18, 2003

(54) SERVO CONTROLLER

(75) Inventors: Yukio Toyozawa, Kumamoto (JP); Naoto Sonoda, Kumamoto (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/817,204

(22) Filed: Mar. 27, 2001

(65) Prior Publication Data
US 2001/0028228 A1 Oct. 11, 2001

(30) Foreign Application Priority Data

Mar. 27, 2000 (JP) ........................................ 2000-085826

(51) Int. Cl.[7] .............................................. G05B 11/32
(52) U.S. Cl. ........................ 318/625; 318/611; 318/623; 318/632
(58) Field of Search .............................. 318/41, 47, 49, 318/51, 85, 705, 568.22, 611, 623, 625, 632

(56) References Cited

U.S. PATENT DOCUMENTS

| 4,087,731 | A |   | 5/1978  | Rhoades ................ 318/625     |
| 4,714,400 | A |   | 12/1987 | Barneh et al. ............ 414/751   |
| 4,914,365 | A | * | 4/1990  | Murakami et al. ......... 318/609    |
| 5,025,200 | A | * | 6/1991  | Kurakake et al. ......... 318/569    |
| 5,646,495 | A | * | 7/1997  | Toyozawa et al. ......... 318/625    |
| 6,046,566 | A | * | 4/2000  | Sonoda et al. ........... 318/625    |
| 6,252,368 | B1| * | 6/2001  | Sugie .................... 318/568.22 |
| 6,274,994 | B2| * | 8/2001  | Tsutsui ................. 315/560     |

FOREIGN PATENT DOCUMENTS

| EP | 0 429 768 | 6/1991 |
| EP | 0 717 331 | 6/1996 |
| EP | 0 952 504 | 10/1999 |

\* cited by examiner

Primary Examiner—Robert E. Nappi
Assistant Examiner—Rina I. Duda
(74) Attorney, Agent, or Firm—Staas & Halsey LLP

(57) ABSTRACT

A servo controller capable of driving a single movable member by two motors with high loop-gain setting to obtain a quick response. A servo controller includes two position controllers associated with respective motors and a damping controller. Each of the position controllers has a position control section to output a velocity command based on an identical position command from a host controller and a position feedback value from an associated position detector, a velocity control section to output a current command based on the velocity command and a velocity feedback value from an associated velocity detector, and a current control section to output a voltage command based on the current command and a current feedback value from an associated current detector. The damping controller outputs a current command correction value for compensating an interference between the two motors based on the velocity feedback values from the velocity detectors for the two motors. The current command correction value is added to or subtracted from the current command in the position controller for one of the two motors and is subtracted from or added to the current command in the other position controller for the other of the two motors.

16 Claims, 7 Drawing Sheets

VELOCITY FB1

VELOCITY FB2

SERVO CONTROLLER

BACKGROUND OF THE INVENTION

1. Field of the Invention

The present invention relates to a servo controller for drivingly controlling an arm of a robot or a feed shaft of a drive mechanism of a machine tool, injection molding machine, pressing machine, etc., and more particularly to tandem control for controlling a single movable member by two motors.

2. Description of Related Art

In drive mechanisms for robots, machine tools, injection molding machines, pressing machines, etc., it is often the case that a movable member to be actuated is too large in size to be accelerated or decelerated by a single motor for driving the shaft of the movable member, or that the backlash between the motor and the movable member is so large that the movable member cannot be moved stably. In such cases, tandem control is performed wherein identical commands are supplied to two motors and the single movable member is cooperatively driven by the two motors. When performing the tandem control, the drive shafts of the individual motors need to be subjected to position control so that the movable member may not be twisted.

FIGS. 6 and 7 each exemplify an arrangement for actuating a single movable member by two motors. In the arrangement shown in FIG. 6, a single movable member 4 is linearly movably arranged between drive shafts 16 and 26 driven by respective two motors 15 and 25. On the other hand, in the arrangement shown in FIG. 7, a single movable member 4 is rotatably arranged between opposing drive shafts 16 and 26 driven by respective two motors 15 and 25. The two motors 15 and 25 are subjected to tandem control such that the single movable member 4 is moved along the drive shafts or is rotated. In this case, mechanical characteristics of the mechanical parts of the motors and movable member can be expressed as a transfer mechanism including a spring system and a friction system.

In FIGS. 6 and 7, the transfer mechanism of the motors and movable member is represented by a spring element 41 and a friction element 42 included in the movable member 4.

As such tandem control for position control, torque tandem control and position tandem control are conventionally known.

FIG. 8 is a block diagram showing an exemplary arrangement for the torque tandem control. In the torque tandem control, only one motor 15 is provided with a position detector 18, and a current command is generated using a position feedback value detected by the position detector 18, to control the two motors 15 and 25.

FIG. 9 is a block diagram showing an exemplary arrangement for the position tandem control. In the position tandem control, both the motors 15 and 25 are provided with position detectors 18 and 28, respectively. A position feedback value detected by the position detector 18 is negatively fed back to position control means 11 for position control, and a position feedback value detected by the position detector 28 is negatively fed back to position control means 21 for position control, thereby to control the two motors 15 and 25.

The conventional tandem control is, however, associated with a problem that the movable member undergoes torsion or vibration and that the control is incapable of quick response in high-speed regions.

In the torque tandem control, the position of only one of the two motors is fed back for control, and thus a problem arises in that torsion occurs between the two motors due to the spring system and friction system of the mechanical parts.

In the position tandem control, on the other hand, torsion between the two motors can be eliminated by performing position feedback control on each of the two motors. If the loop gain is increased in order to achieve quick response in high-speed regions, however, interference between the two drive shafts occurs due to the spring element or the friction element, causing vibrations. As a result, the control fails to be stabilized and the response cannot be improved in high-speed regions.

A similar problem arises also in the case of the rotation-type tandem control shown in FIG. 7 when the loop gain is set high in order to improve the rotation accuracy.

SUMMARY OF THE INVENTION

An object of the present invention is to provide a servo controller capable of driving a single movable member by two motors with high loop-gain setting to obtain a quick response.

According to the present invention, current commands are corrected based on velocity feedback values from two motors so as to suppress mutual interference due to a difference between mechanical characteristics of drive mechanisms, thus making it possible to set a high loop gain for achieving a quick response.

A servo controller for controlling two motors for cooperatively driving a single movable member of a machine comprises two position controllers respectively controlling the two motors and a damping controller. Each of the position controllers has a position control section to output a velocity command based on an identical position command from a host controller and a position feedback value from an associated position detector provided at the machine, a velocity control section to output a current command based on the velocity command outputted from the position control section and a velocity feedback value from a velocity detector provided at an associated motor, and a current control section to output a voltage command based on the current command outputted from the velocity control section and a current feedback value from a current detector for detecting a current of the associated motor, to operate a current amplifier in accordance with the voltage command.

The damping controller outputs a current command correction value for compensating an interference between the two motors based on the velocity feedback values from the velocity detectors for the two motors.

The current command correction value is added to or subtracted from the current command in the position controller for one of the two motors and is subtracted from or added to the current command in the other position controller for the other of the two motors.

The damping controller may include first computing means for integrating a deviation between the velocity feedback values from the velocity detectors associated with the two motors and multiplying the integrated value by a first constant, and second computing means for multiplying the deviation of the velocity feedback values by a second constant. Outputs of the first and second computing means is added together for use as said current command correction value.

The first computing means obtains a position deviation by integrating the deviation between the velocity feedback values of two motors (drive shafts), and compensates spring element in a mechanical system by multiplying the position deviation by a first constant equivalent to a spring constant of the machine. The second computing means compensates friction element in the mechanical system by multiplying the velocity deviation between the two motors (drive shafts) by a second constant equivalent to a friction coefficient of the machine. With the above first and second computing means, both of the spring compensation and the friction compensation are performed in the mechanical system.

The damping controller may include either the first computing means or the second computing means for performing either the spring compensation or the friction compensation.

The damping controller may further include phase advancing/compensating means for advancing a phase of the current command correction value. The phase advancing/compensating means compensates a delay of the correction that is caused by a delay of the current control sections of the position controllers or of the detection system.

The servo controller of the present invention may further comprise vibration applying/measuring means for determining appropriateness of parameters of the damping controller.

The servo controller of the present invention may further comprise vibration applying/measuring means for determining appropriateness of a parameter of the damping controller. The parameter of the damping controller includes the first constant in the first computing means which is equivalent to the spring constant of the machine, the second constant in the second computing means which is equivalent to the friction coefficient of the machine, and a phase-advance amount in the phase advancing/compensating means. The vibration applying/measuring means generates a vibration application current command having a variable frequency, and adds the vibration application current command to the current command in one of the position controllers. A degree of the interference is observed based on the velocity feedback value from the velocity detector for one of the motors that varies by the addition of the vibration application current command. Thus, optimum values of the parameters can be determined by observing variation of the velocity feedback value while varying the first constant, the second constant and the phase-advance amount.

The vibration applying/measuring means may include a first means for generating a sine-sweep current command having a variable frequency, a second means for adding the sine-sweep current command to the current command in one of the position controller, and a third means for outputting the frequency of the sine-sweep current command and one of the velocity feedback values. While varying the frequency of the sine-sweep current command, variation of the velocity feedback value is observed to check the appropriateness of the parameters of the damping controller.

The sine-sweep current command generating means may vary the frequency thereof at every sampling period by multiplying the sampling period by a counting value increasing at every sampling period.

The sine-sweep current command generating means of the vibration applying/measuring means may be configured such that the frequency of the sine-sweep current command is varied with every sampling period, by multiplying a value of the sampling period by a count value which is incremented with every sampling period.

In the servo controller of the present invention, the position detectors may be provided at a driving system including the movable member and the motors of the machine. The position detectors detect positions of mechanical elements driven by the respective motors or the motors themselves and output the detected positions as the position feedback values.

DETAILED DESCRIPTION OF THE PREFERRED EMBODIMENTS

Figure 1:
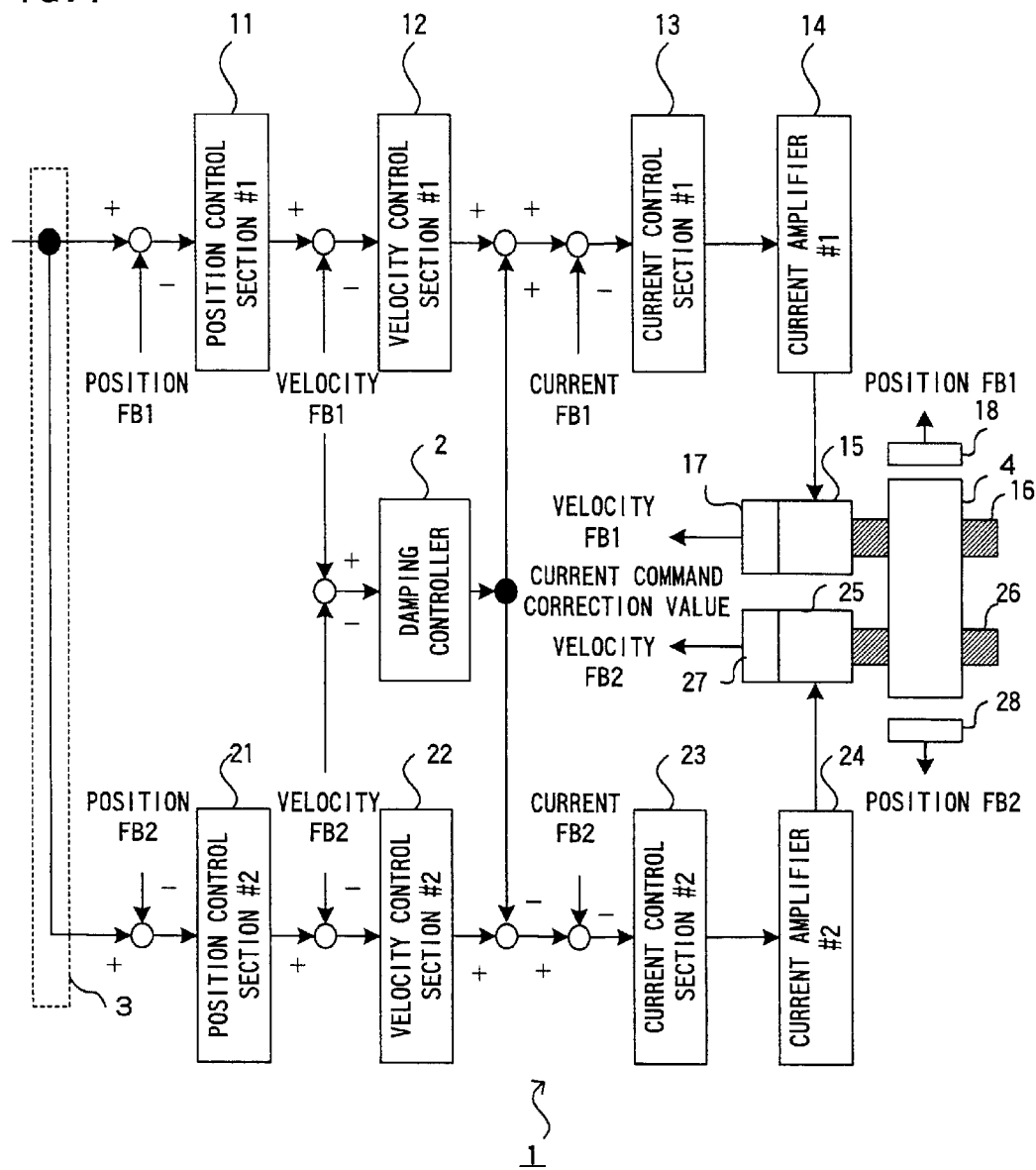
FIG. 1 is a schematic block diagram illustrating a servo controller according to the present invention.

FIG. 1 is a schematic block diagram illustrating a servo controller according to the present invention. The servo controller 1 controls a drive mechanism for driving a single movable member 4 by two motors of a first motor 15 and a second motor 25, by performing a tandem control of the two motors using position controllers respectively provided for the two motors, and a damping controller 2.

The position controller for the first motor 15 includes a position control section 11, a velocity control section 12, a current control section 13, and a current amplifier 14. The first motor 15 is provided with a velocity detector 17 for detecting a velocity feedback amount (velocity FB1), and a position detector 18 is provided at the first-motor side of the movable member 4 for detecting a position feedback amount (position FB1). Also, the position controller for the second motor 25 includes a position control section 21, a velocity control section 22, a current control section 23, and a current amplifier 24. The second motor 25 is provided with a velocity detector 27 for detecting a velocity feedback amount (velocity FB2), and a position detector 28 is provided at the second-motor side of the movable member 4 for detecting a position feedback amount (position FB2). Depending on conditions such as rigidity of the movable member 4, one or both of the position detectors 18 and 28 may be arranged inside the respective motors, instead of being mounted to the movable member 4.

The position control sections 11 and 21 receive identical position commands from a host controller, i.e., position commands distributed by a command distributor 3, and each output a velocity command by processing a position deviation value which is obtained by subtracting the position feedback amount (position FB1, position FB2) detected by the corresponding position detector 18, 28 from the position command.

Each of the velocity control sections 12 and 22 receives the velocity command from the corresponding position control section 11, 21, and outputs a current command by processing a velocity deviation value which is obtained by subtracting, from the velocity command, the velocity feedback amount (velocity FB1, velocity FB2) detected by the corresponding velocity detector 17, 27 mounted to the corresponding motor.

The current control sections 13 and 23 each receive the current command from the corresponding velocity control section 12, 22, and output a voltage command by processing a current deviation value which is obtained by subtracting, from the current command, a current feedback amount (current FB1, current FB2) from a sensor (not shown) for detecting a corresponding motor current.

Each of the current amplifiers 14 and 24 receives the voltage command from the corresponding current control section 13, 23, and generates a driving current for driving the corresponding motor 15, 25 to drive the same.

Based on a deviation between the velocity feedback amounts (velocity FB1, velocity FB2) detected by the respective velocity detectors 17 and 27, the damping controller 2 generates a current command correction value for compensating for interference between the motors, and corrects the current commands by adding/subtracting the current command correction value to/from the current command of the position controller associated with one of the motors and subtracting/adding the current command correction value from/to the current command of the position controller associated with the other motor. Thus, the current command correction value is added, with its polarity inverted, to the current commands of the position controllers associated with the respective two motors. This is because the current command correction value is generated based on the deviation between the velocity feedback amounts (velocity FB1, velocity FB2).

Figure 2:
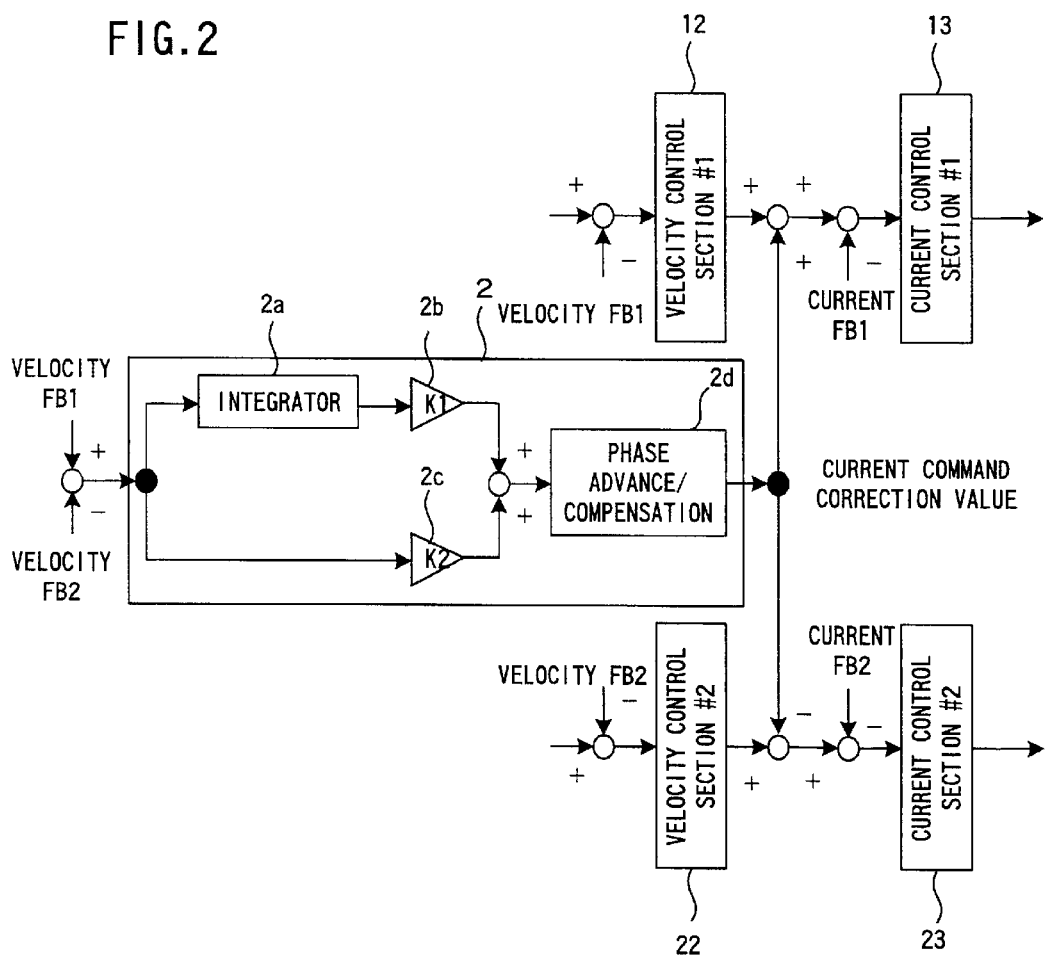
FIG. 2 is a block diagram illustrating an exemplary arrangement of a damping controller provided in the servo controller according to the present invention.

An exemplary arrangement of the damping controller will be described with reference to the block diagram of FIG. 2. FIG. 2 shows only part of the servo controller.

As shown in FIG. 2, the damping controller 2 comprises first computing means 2a, 2b, second computing means 2c, and phase advancing/compensating means 2d.

The first computing means includes an integrator 2a for obtaining a difference (velocity FB1–velocity FB2) between the velocity feedback amounts from the two motors and integrating the thus-obtained velocity feedback deviation, and a constant multiplier 2b for multiplying the resulting integrated value by a constant. The integrator 2a integrates the velocity deviation (velocity FB1–velocity FB2) between the two motors (drive shafts) to obtain a position deviation. The constant multiplier 2b multiplies the position deviation by a first constant K1 corresponding to a spring constant of a machine to be controlled, thereby to make spring compensation for the mechanical system.

The second computing means includes a constant multiplier 2c for multiplying the velocity feedback deviation (velocity FB1–velocity FB2) by a constant. The constant multiplier 2c multiplies the velocity deviation (velocity FB1–velocity FB2) between the two motors (drive shafts) by a second constant K2 corresponding to a friction coefficient of the machine to be controlled, thereby to make friction compensation for the mechanical system. The first and second constants K1 and K2 correspond to gains of the respective computing means.

The phase advancing/compensating means 2d adds together the outputs of the first and second computing means to obtain a current command correction value, and advances the phase of the current command correction value. The phase advancing/compensating means 2d compensates for a delay of correction that is caused by a delay of the current control sections of the position controllers or of the detection systems.

For the phase advancing/compensating means 2d, a phase advancing/compensating element having the characteristic of a transfer function G(s) indicated by the following equation may be used:

$$G(s)=(1+Ts)/(1+\alpha Ts) \qquad (1)$$

where s denotes a differential operator of the Laplace transform, and variables T and $\alpha$ have a relationship expressed by the following equations (2) and (3):

$$\text{Maximum phase-advance frequency } w=1/(T \cdot \alpha^{1/2}) \qquad (2)$$

$$\text{Maximum phase-advance amount } \phi=\arctan\{(\alpha-1)/(2 \cdot \alpha^{1/2})\} \qquad (3)$$

where the unit of w is rad/sec, and the unit of $\phi$ is deg. The amount by which the phase is advanced by the phase advancing/compensating means 2d can be varied by using T and $\alpha$ as parameter values.

The damping controller may be constructed using either the first computing means (2a, 2b) or the second computing means 2c alone, or both of the computing means such that their outputs are added together as mentioned above. Also, the phase advancing/compensating means 2d may be either added to or omitted from the damping controller including only the first computing means (2a, 2b) or the second computing means 2c, or the combination of both the first and second computing means.

Thus, the damping controller 2 includes parameters such as the first constant K1 of the first computing means corresponding to the spring constant of the machine to be controlled, the second constant K2 of the second computing means corresponding to the friction coefficient of the machine to be controlled, and the parameter values T and $\alpha$ of the phase advancing/compensating means related to the phase-advance amount.

The servo controller of the present invention may be further provided with vibration applying/measuring device for determining whether or not the parameters of the damping controller 2 have appropriate values.

Figure 3:
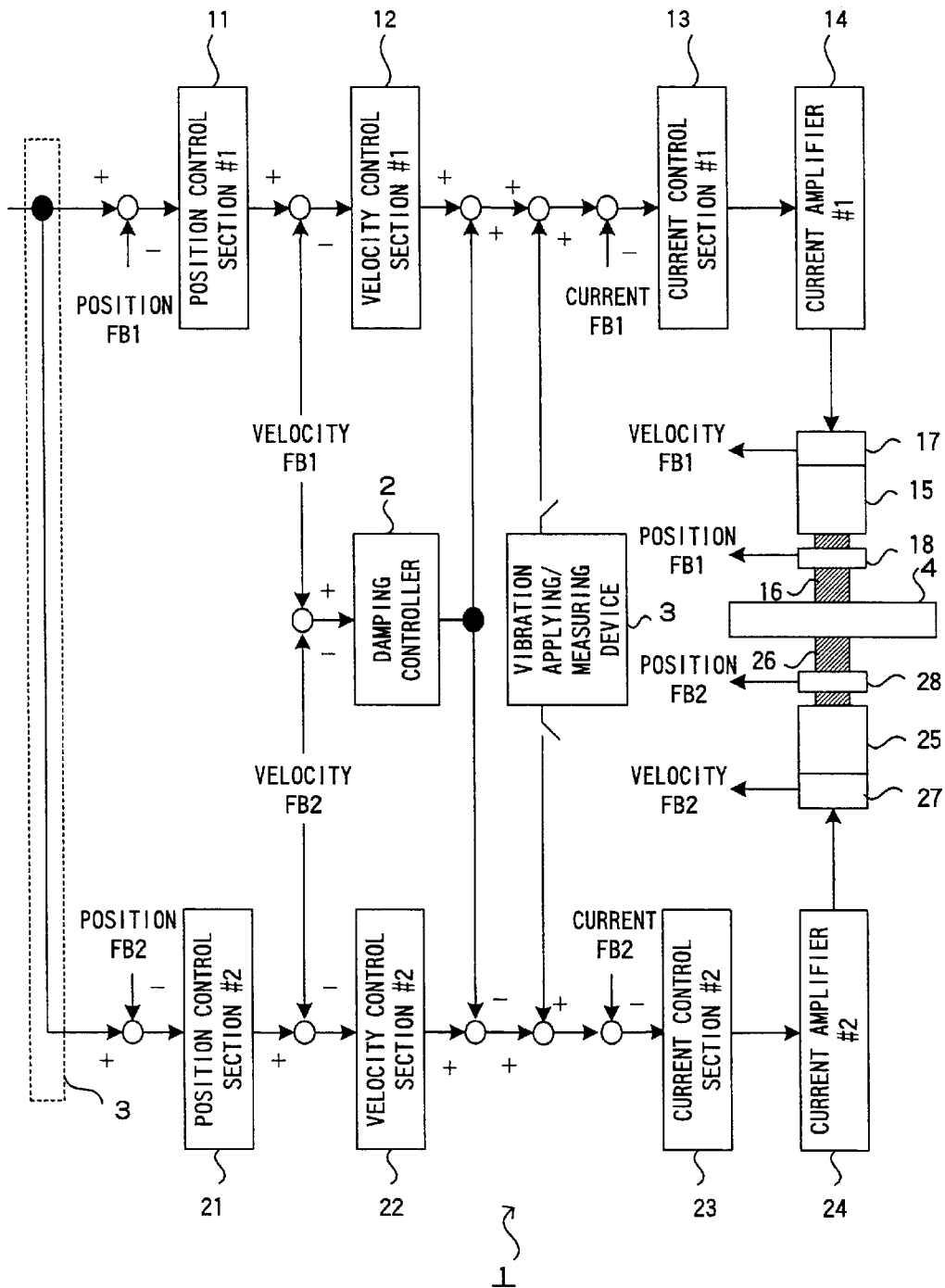
FIG. 3 is a block diagram illustrating the connection of vibration applying/measuring device to the servo controller.

FIG. 3 is a block diagram illustrating how the vibration applying/measuring device is connected to the servo controller.

In the arrangement shown in FIG. 1, the vibration applying/measuring device is connected to the servo controller 1 in a manner such that it can be selectively connected to either of input stages of the current control sections 13 and 23. The vibration applying/measuring device 3 generates a vibration application current command having a variable frequency, and adds the vibration application current command to the current command input to one of the current control sections. The vibration application current command simulatively creates a state in which the movable member and the motor are vibrating. The vibration applying/measuring device permits the simulatively created vibrating state to be observed in terms of the motor velocity feedback amount, thus making it possible to observe the degree of interference between the two motors (drive shafts). Consequently, whether the parameters of the damping controller are appropriate or not can be determined, so that their optimum values can be ascertained. Also, by observing the motor velocity feedback amount while varying the parameters (first constant K1, second constant K2, and phase-advance amount) of the damping controller, it is possible to derive appropriate values for the parameters of the damping controller.

Figure 4:
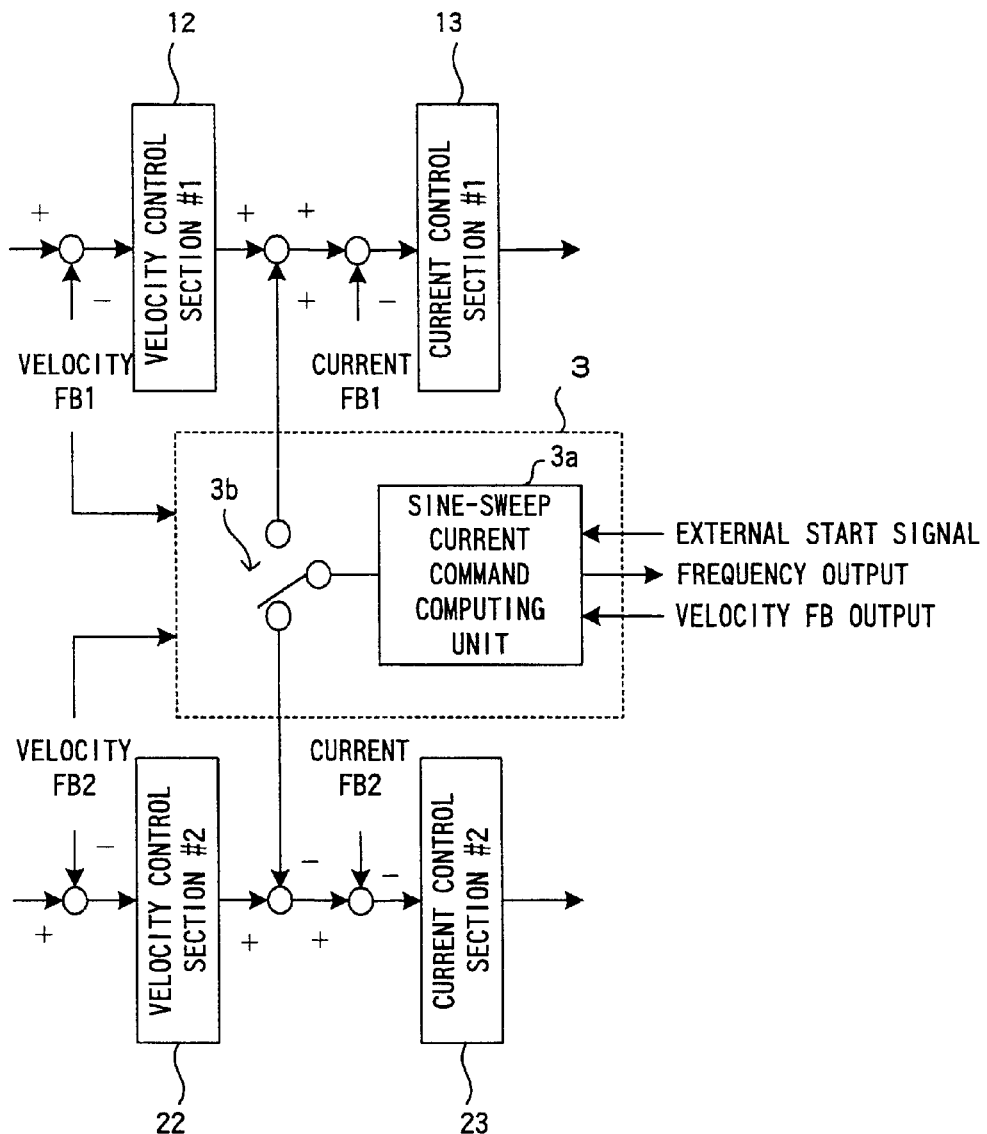
FIG. 4 is a block diagram illustrating an exemplary arrangement of the vibration applying/measuring device.

An exemplary arrangement of the vibration applying/measuring device will be described with reference to the block diagram of FIG. 4. FIG. 4 shows only part of the servo controller.

As shown in FIG. 4, the vibration applying/measuring device 3 includes a sine-sweep current command computing unit 3a and a changeover switch 3b.

The sine-sweep current command computing unit 3a generates a sine-sweep current command having a variable frequency.

As the sine-sweep current command T, a command current indicated by the following equations may be used.

$$T = A \cdot \sin(2\pi \cdot f) \quad (4)$$

$$f = \beta \cdot n \cdot t \quad (5)$$

where A is a maximum value of the current command, "t" is a sampling period, "n" is a counter number triggered by an external signal and incremented with every sampling period, β is a constant, and "f" is a frequency (Hz). Accordingly, the frequency f increases with every sampling period. The generation of the sine-sweep current command T is stopped when the frequency f reaches a predetermined frequency.

The changeover switch 3b selects one of the current control sections to which the sine-sweep current command T is to be applied, and also selects one of the motors from which the velocity feedback is to be outputted. For example, in the case where the sine-sweep current command T is applied to the current control section 13 associated with the first motor 15, the velocity feedback from the second motor 25 is outputted. On the other hand, in the case where the sine-sweep current command T is applied to the current control section 23 associated with the second motor 25, the velocity feedback from the first motor 15 is outputted.

Thus, where to input the sine-sweep current command T and from where the velocity feedback amount is to be outputted are changed over by the changeover switch 3b, so that one of the two motors (drive shafts) can be simulatively vibrated while the velocity feedback from the motor (drive shaft) that is not vibrated can be measured, making it possible to observe the degree of interference compensation by the damping controller.

Also, the vibration applying/measuring device 3 outputs the vibration application frequency f along with the velocity feedback amount, and therefore, how the velocity feedback amount changes with the varying vibration application frequency f can be observed.

The vibration applying/measuring device 3 can provide its output in desired signal form, either as a digital amount or an analog amount obtained by subjecting the digital amount to D/A conversion.

FIG. 5 shows, by way of example, results of experiments conducted using the servo controller according to the present invention and a conventional servo controller. In FIG. 5, the vertical axis indicates the velocity detection value and the frequency of the sine-sweep current command, and the horizontal axis indicates time. The larger the amplitude of the velocity detection value, the greater influence is caused by interference.

Figure 5A:
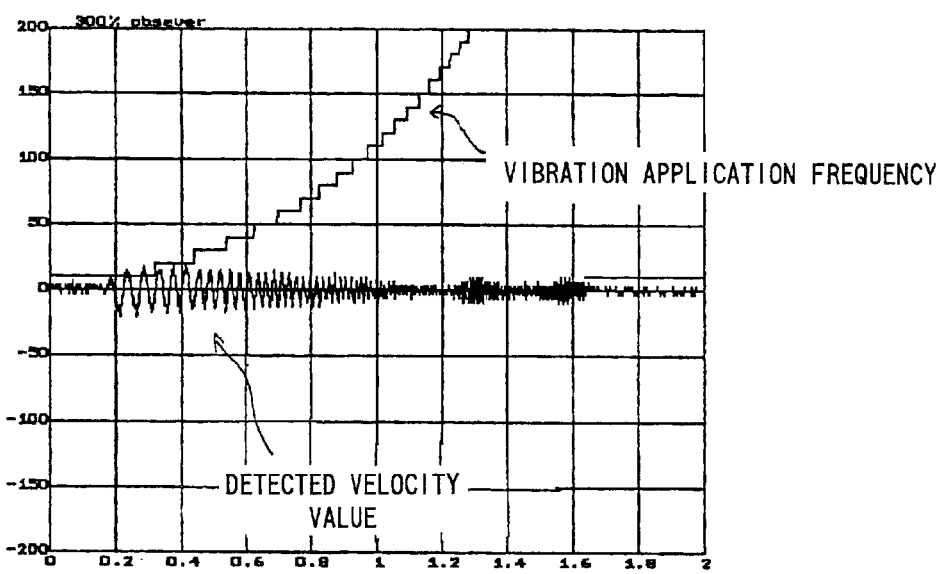
FIGS. 5a and 5b are graphs showing results of experiments obtained with the servo controller according to the present invention and a conventional servo controller, respectively.
Figure 5B:
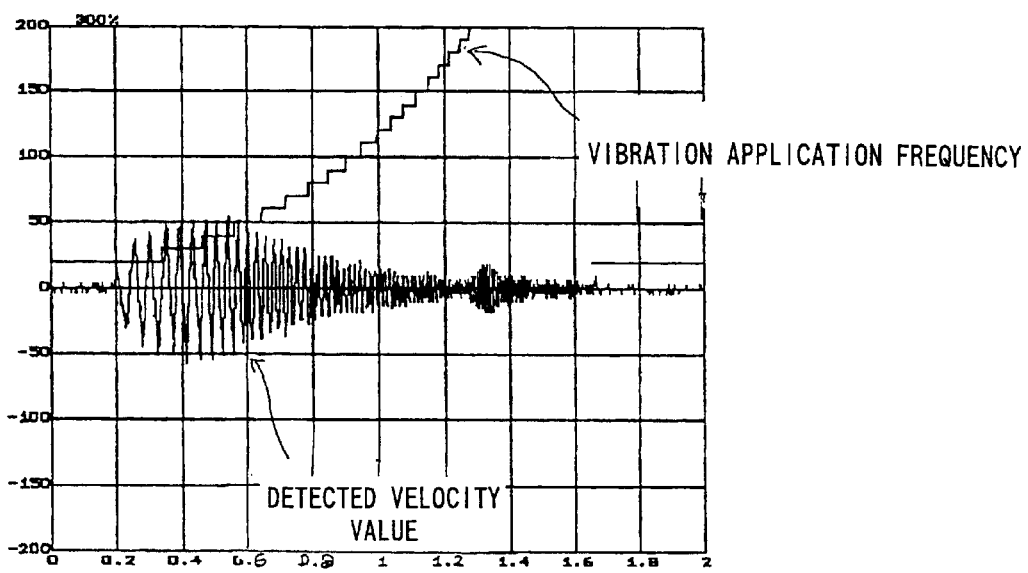
Figure 6:
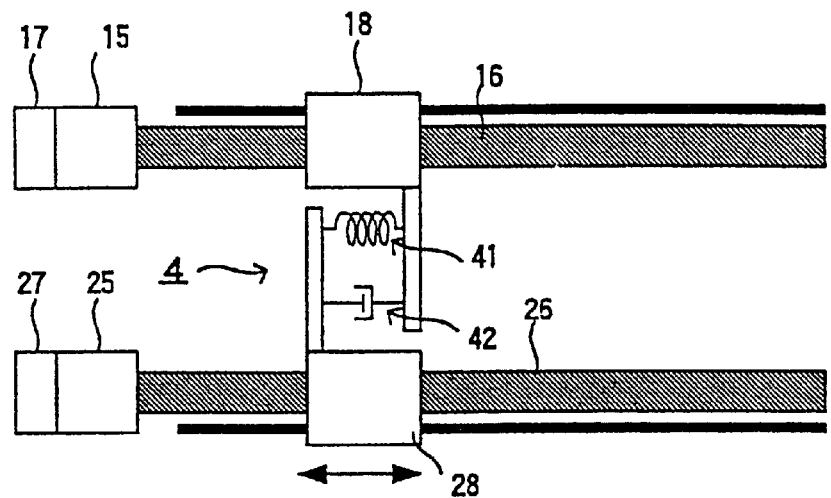
FIG. 6 is a diagram showing an exemplary arrangement for actuating a single movable member by two motors.
Figure 7:
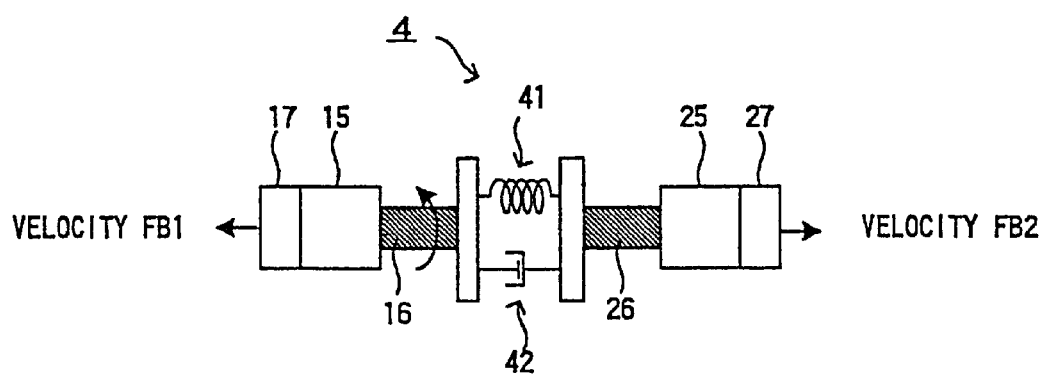
FIG. 7 is a diagram showing another exemplary arrangement for actuating a single movable member by two motors.
Figure 8:
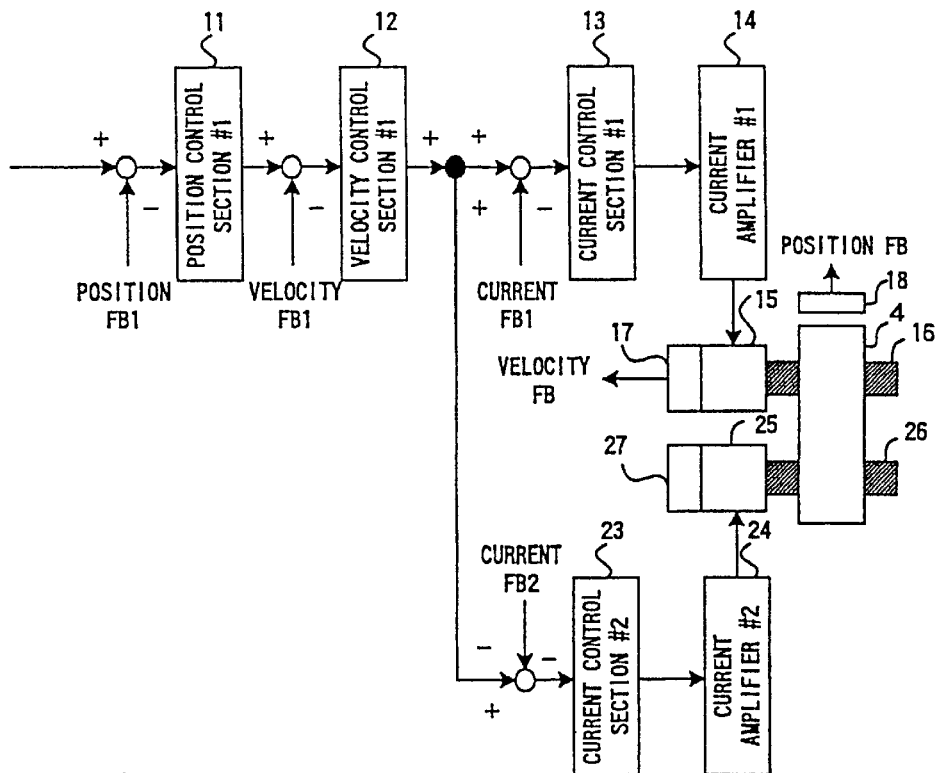
FIG. 8 is a block diagram showing an exemplary arrangement for torque tandem control.
Figure 9:
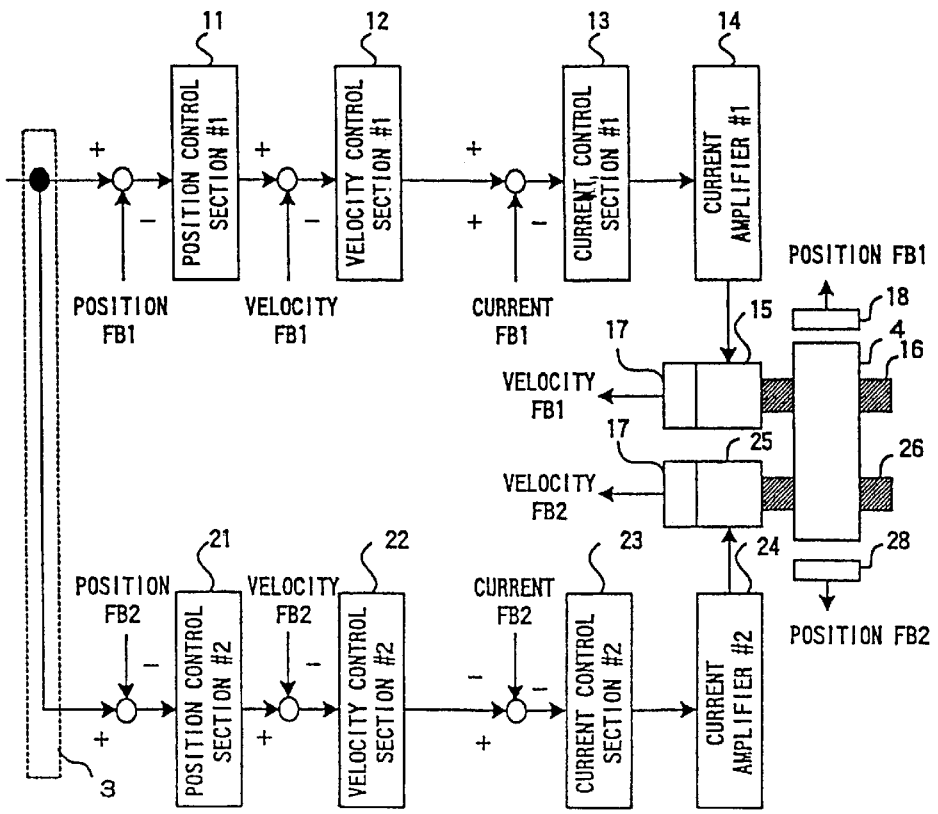
FIG. 9 is a block diagram showing an exemplary arrangement for position tandem control.

FIG. 5a shows the results of experiment obtained with the servo controller according to the present invention, and FIG. 5b shows the results of experiment obtained with the conventional servo controller. Comparison between FIGS. 5a and 5b reveals that in the servo controller of the present invention, the amplitude of the velocity detection value is suppressed to a low level, compared with that of the conventional servo controller, proving that the influence of the interference is suppressed in the present invention.

According to the present invention, in a tandem control for controlling a single drive system by two motors based on a common position command, an interference between the two motors caused by a difference of characteristics of a spring element or a friction element is suppressed by the damping controller, to suppress vibrations of the machine. Thus, the loop gain can be set high and also the response can be greatly improved.

Further, with the vibration applying/measuring means, it is possible to check an effect of suppression of the interference between the two motors and their drive shafts by the damping controller, and also adjust the parameters of the damping controller.

What is claimed is:

1. A servo controller for controlling two motors for cooperatively driving a single movable member of a machine, comprising:

a position controller provided for each of the two motors, each of said position controllers having a position control section to output a velocity command based on an identical position command from a host controller and a position feedback value from an associated position detector provided at the machine, a velocity control section to output a current command based on the velocity command outputted from said position control section and a velocity feedback value from a velocity detector provided at an associated motor, and a current control section to output a voltage command based on the current command outputted from said velocity control section and a current feedback value from a current detector for detecting a current of the associated motor, to operate a current amplifier in accordance with the voltage command; and a damping controller to output a current command correction value for compensating an interference between the two motors based on the velocity feedback values from the velocity detectors for the two motors, said current command correction value being added to or subtracted from the current command in the position controller for one of the two motors and is subtracted from or added to the current command in the other position controller for the other of the two motors, wherein said damping controller comprises first computing means for integrating a deviation between the velocity feedback values from the velocity detectors associated with the two motors and multiplying the integrated value by a first constant, and second computing means for multiplying the deviation of the velocity feedback values by a second constant, outputs of said first and second computing means being added together for use as said current command correction value.

2. A servo controller according to claim 1, wherein said damping controller further includes phase advancing/compensating means for advancing a phase of the current command correction value.

3. A servo controller for controlling two motors for cooperatively driving a single movable member of a machine, comprising:

a position controller provided for each of the two motors, each of said position controllers having a position control section to output a velocity command based on an identical position command from a host controller and a position feedback value from an associated position detector provided at the machine, a velocity control section to output a current command based on the velocity command outputted from said position control section and a velocity feedback value from a velocity detector provided at an associated motor, and a current control section to output a voltage command based on the current command outputted from said velocity control section and a current feedback value from a current detector for detecting a current of the associated motor, to operate a current amplifier in accordance with the voltage command; and a damping controller to output a current command correction value for compensating an interference between the two motors based on the velocity feedback values from the velocity detectors for the two motors, said current command correction value being added to or subtracted from the current command in the position controller for one of the two motors and is subtracted from or added to the current command in the other position controller for the other of the two motors, wherein said damping controller comprises computing means for integrating a deviation between the velocity feedback values from the velocity detectors associated with the two motors and multiplying the integrated value by a constant, an output of said computing means being used as said current command correction value.

4. A servo controller for controlling two motors for cooperatively driving a single movable member of a machine, comprising:

a position controller provided for each of the two motors, each of said position controllers having a position control section to output a velocity command based on an identical position command from a host controller and a position feedback value from an associated position detector provided at the machine, a velocity control section to output a current command based on the velocity command outputted from said position control section and a velocity feedback value from a velocity detector provided at an associated motor, and a current control section to output a voltage command based on the current command outputted from said velocity control section and a current feedback value from a current detector for detecting a current of the associated motor, to operate a current amplifier in accordance with the voltage command; and a damping controller to output a current command correction value for compensating an interference between the two motors based on the velocity feedback values from the velocity detectors for the two motors, said current command correction value being added to or subtracted from the current command in the position controller for one of the two motors and is subtracted from or added to the current command in the other position controller for the other of the two motors, wherein said damping controller comprises computing means for multiplying a deviation between the velocity feedbacks values from the velocity detectors associated with the two motors by a constant, an output of the computing means being used as said current command correction value.

5. A servo controller for controlling two motors for cooperatively driving a single movable member of a machine, comprising:

a position controller provided for each of the two motors, each of said position controllers having a position control section to output a velocity command based on an identical position command from a host controller and a position feedback value from an associated position detector provided at the machine, a velocity control section to output a current command based on the velocity command outputted from said position control section and a velocity feedback value from a velocity detector provided at an associated motor, and a current control section to output a voltage command based on the current command outputted from said velocity control section and a current feedback value from a current detector for detecting a current of the associated motor, to operate a current amplifier in accordance with the voltage command; and a damping controller to output a current command correction value for compensating an interference between the two motors based on the velocity feedback values from the velocity detectors for the two motors, said current command correction value being added to or subtracted from the current command in the position controller for one of the two motors and is subtracted from or added to the current command in the other position controller for the other of the two motors, vibration applying/measuring means for generating a vibration application current command having a variable frequency and adding the vibration application current command to the current command in one of said position controllers so as to determine appropriateness of parameters of said damping controller based on a variation in the velocity feedback value from the velocity detector for one of the motors.

6. A servo controller according to claim 5, wherein said vibration applying/measuring means comprises a first means for generating a sine-sweep current command having a variable frequency, a second means for adding the sine-sweep current command to the current command in one of the position controller, and a third means for outputting the frequency of the sine-sweep current command and one of the velocity feedback values.

7. A servo controller according to claim 6, wherein said first means for generating the, sine-sweep current command varies the frequency thereof at every sampling period by multiplying the sampling period by a counting value increasing at every sampling period.

8. An apparatus, comprising:

a first motor with a first velocity detector and a second motor with a second velocity detector; and a damping controller outputting a current command correction value for compensating an interference between the first motor and the second motor based on velocity feedback values from the first velocity detector and the second velocity detector, wherein the current command correction value being added to a current command in a first position controller for the first motor and is subtracted from the current command in a second position controller for the second motor, wherein the damping controller comprises a first computing unit integrating a deviation between the velocity feedback values from the velocity detectors associated with the two motors and multiplying the integrated value by a first constant, and second computing unit for multiplying the deviation of the velocity feedback values by a second constant, outputs of the first and second computing means being added together for use as the current command correction value.

9. An apparatus as recited in claim 8, wherein the damping controller further includes phase advancing/compensating means for advancing a phase of the current command correction value.

10. An apparatus, comprising:
   a first motor with a first velocity detector and a second motor with a second velocity detector; and
   a damping controller outputting a current command correction value for compensating an interference between the first motor and the second motor based on velocity feedback values from the first velocity detector and the second velocity detector,
   wherein the current command correction value being added to a current command in a first position controller for the first motor and is subtracted from the current command in a second position controller for the second motor,
   wherein the damping controller includes a computing unit integrating a deviation between the velocity feedback values from the velocity detectors associated with the two motors and multiplying the integrated value by a constant, an output of the computing unit being used as the current command correction value.

11. An apparatus, comprising:
   a first motor with a first velocity detector and a second motor with a second velocity detector; and
   a damping controller outputting a current command correction value for compensating an interference between the first motor and the second motor based on velocity feedback values from the first velocity detector and the second velocity detector,
   wherein the current command correction value being added to a current command in a first position controller for the first motor and is subtracted from the current command in a second position controller for the second motor,
   wherein the damping controller includes a computing unit multiplying a deviation between the velocity feedbacks values from the velocity detectors associated with the two motors by a constant, an output of the computing unit being used as the current command correction value.

12. An apparatus, comprising:
   a first motor with a first velocity detector and a second motor with a second velocity detector; and
   a damping controller outputting a current command correction value for compensating an interference between the first motor and the second motor based on velocity feedback values from the first velocity detector and the second velocity detector,
   wherein the current command correction value being added to a current command in a first position controller for the first motor and is subtracted from the current command in a second position controller for the second motor,
   a vibration applying/measuring unit generating a vibration application current command having a variable frequency and adding the vibration application current command to the current command in one of the position controllers to determine appropriateness of parameters of the damping controller based on a variation in the velocity feedback value from the velocity detector for one of the motors.

13. An apparatus as recited in claim 12, wherein the vibration applying/measuring unit comprises a first unit generating a sine-sweep current command having a variable frequency, a second unit adding the sine-sweep current command to the current command in one of the position controller, and a third unit outputting the frequency of the sine-sweep current command and one of the velocity feedback values.

14. A servo controller according to claim 13, wherein the first unit generating the sine-sweep current command varies the frequency thereof at every sampling period by multiplying the sampling period by a counting value increasing at every sampling period.

15. An apparatus, comprising:
   a first motor with a first velocity detector and a second motor with a second velocity detector;
   a damping controller outputting a current command correction value for compensating an interference between the first motor and the second motor based on velocity feedback values from the first velocity detector and the second velocity detector; and
   a computing unit integrating a deviation between the velocity feedback values and multiplying the deviation by a first and/or second constant, wherein the output of the computing unit is used as a current command correction value.

16. An apparatus, comprising:
   a first motor with a first velocity detector and a second motor with a second velocity detector;
   a damping controller outputting a current command correction value for compensating an interference between the first motor and the second motor based on velocity feedback values from the first velocity detector and the second velocity detector; and
   a vibration unit generating a vibration application current command having a variable frequency and adding the vibration application current command to the current command in one of the position controllers.

* * * * *